Figure 1:
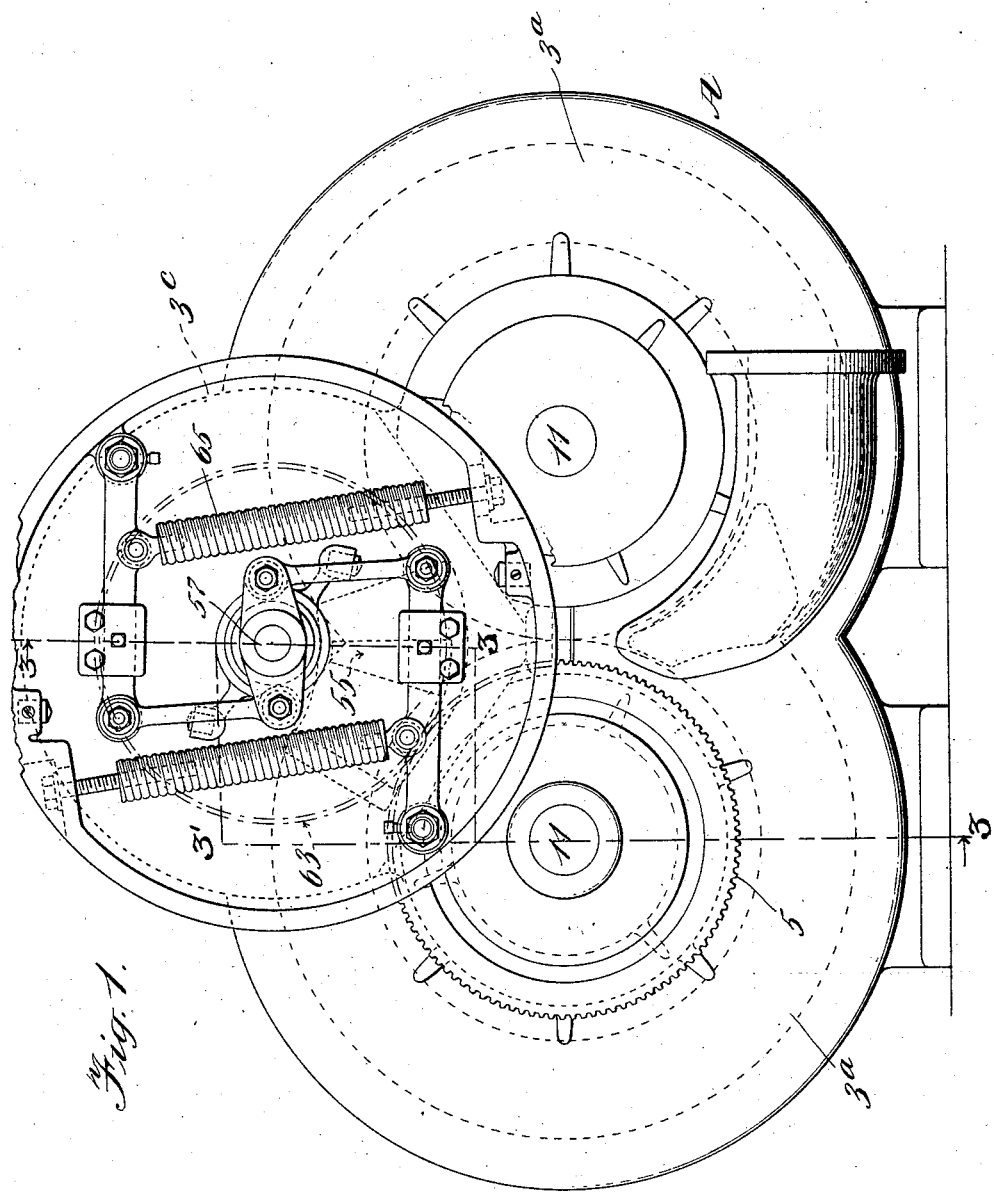

G. P. HERRICK.
ROTARY ENGINE.
APPLICATION FILED MAY 14, 1910.

1,048,158.

Patented Dec. 24, 1912.
6 SHEETS—SHEET 1.

Witnesses:

Gerardus Post Herrick  Inventor
By his Attorney Gifford & Bull

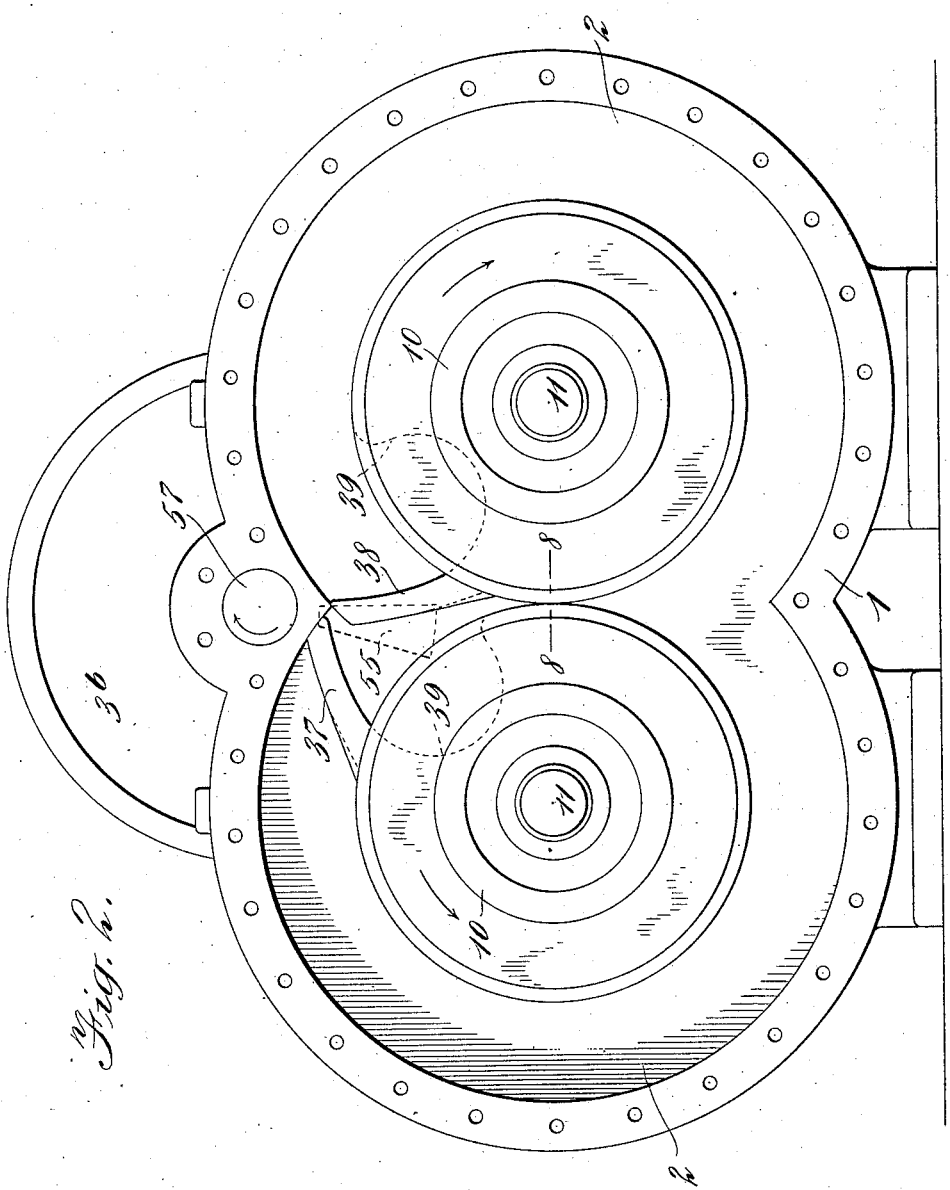

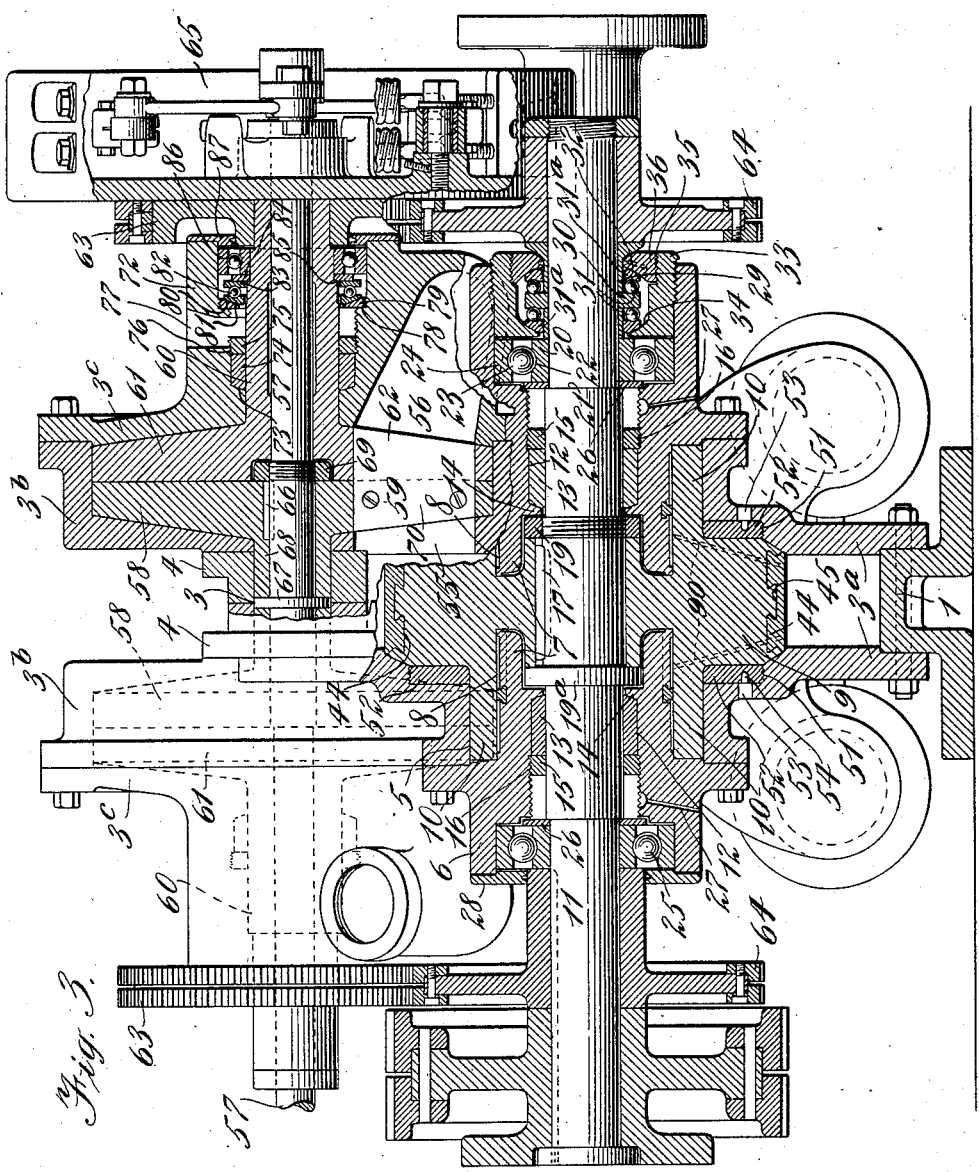

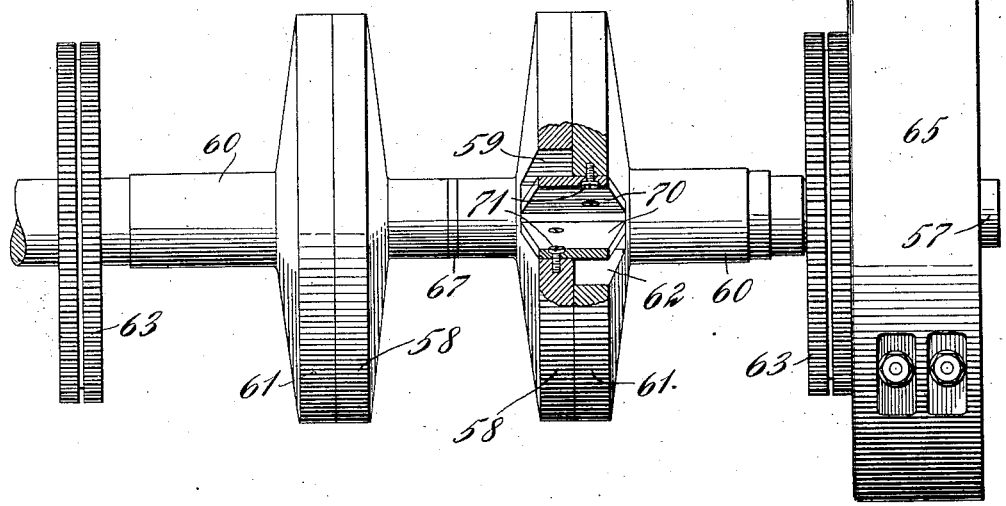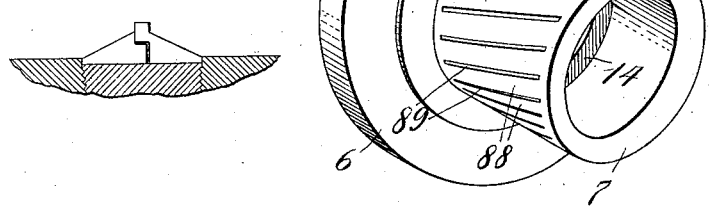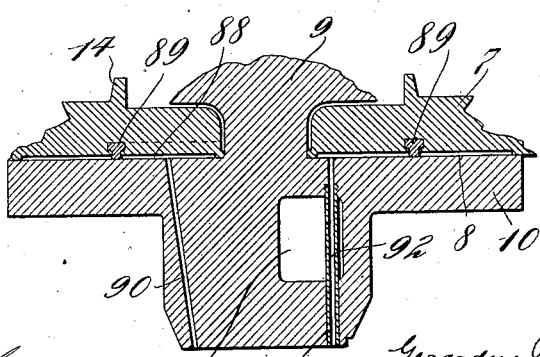

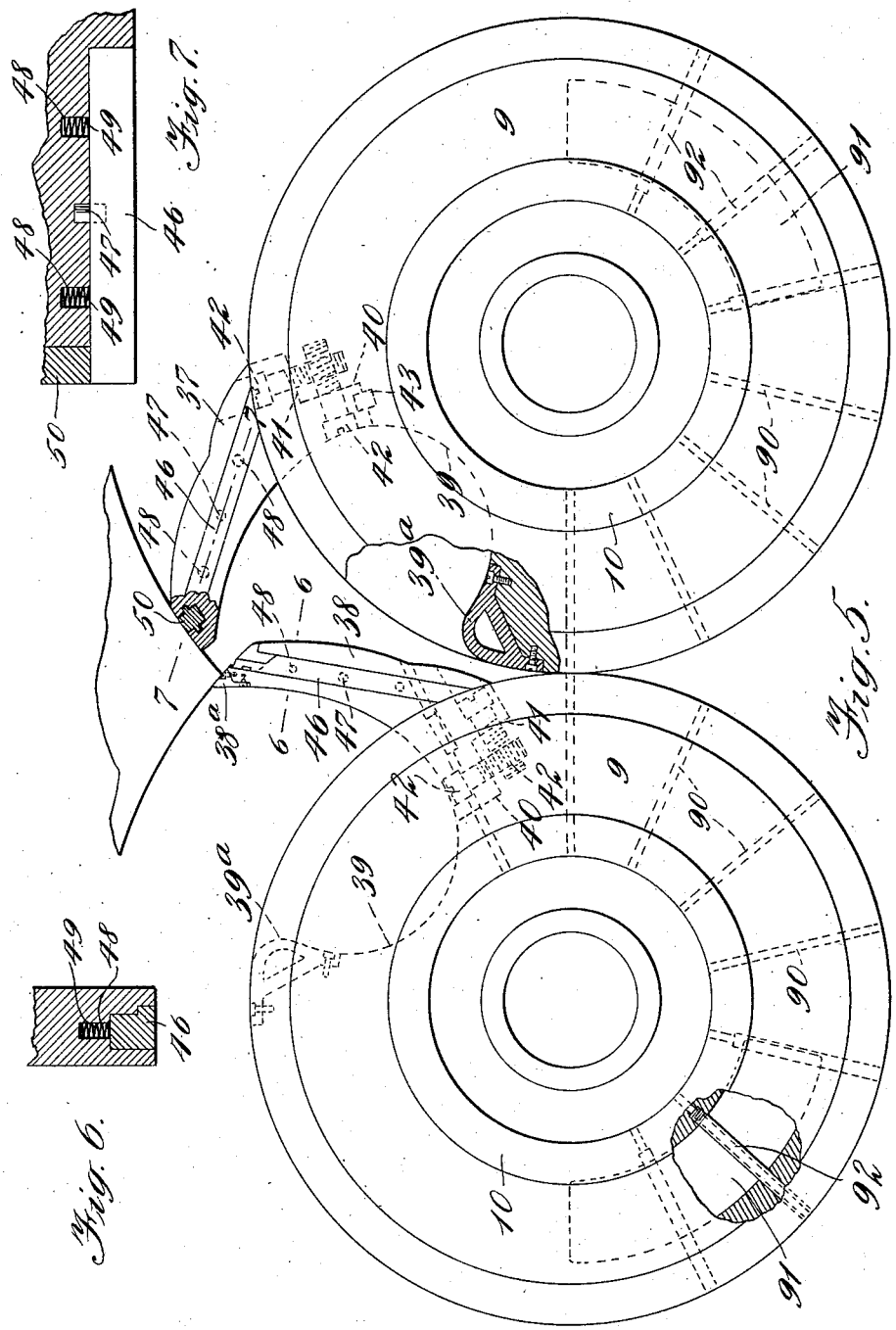

G. P. HERRICK.
ROTARY ENGINE.
APPLICATION FILED MAY 14, 1910.
1,048,158.
Patented Dec. 24, 1912.
6 SHEETS—SHEET 6.
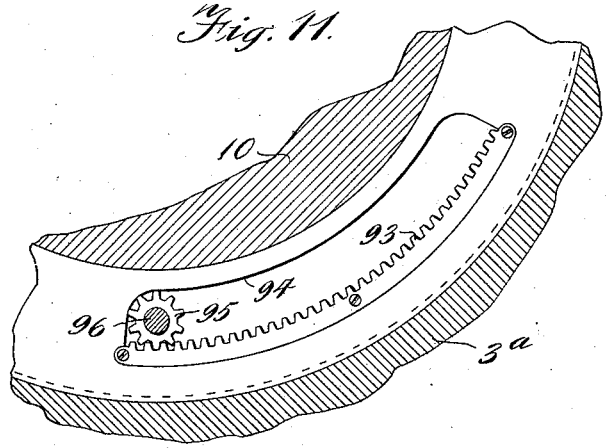
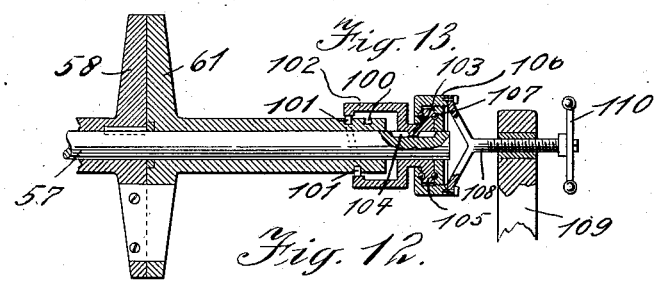
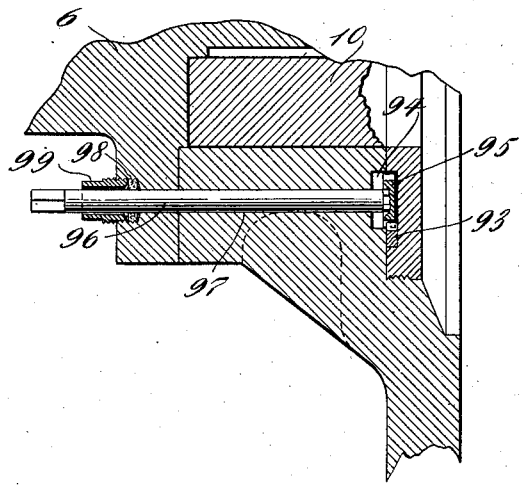
Witnesses:
Inventor
Gerardus Post Herrick
By his Attorneys
Gifford & Bull

UNITED STATES PATENT OFFICE.

GERARDUS POST HERRICK, OF NEW YORK, N. Y.

ROTARY ENGINE.

1,048,158.      Specification of Letters Patent.      Patented Dec. 24, 1912.

Application filed May 14, 1910. Serial No. 561,372.

*To all whom it may concern:*

Be it known that I, GERARDUS POST HERRICK, a citizen of the United States, and a resident of New York city, borough of Manhattan, in the county of New York and State of New York, have invented certain new and useful Improvements in Rotary Engines, of which the following is a specification.

My invention relates to new and useful improvements in rotary engines of that character or type in which the motive fluid, such for instance as steam, is used expansively between an abutment and a piston carried by a rotatable member for the purpose of imparting rotation to the latter.

The primary object of the invention is to provide a rotary engine of the character set forth which is comparatively simple in construction, and efficient in operation, and which will be capable of developing power with a high degree of economy of steam consumption.

A further object is to provide an improved form of cut-off valve and controlling means therefor, for regulating the admission of the motive fluid to the piston chamber of the engine.

In connection with this improved valve structure it is also my purpose to provide improved means for so balancing the valve that its shaft will be relieved from end thrust.

Another object is to provide simple and effective means for establishing a contact between the rotary carrying the piston and the abutment which will be as impervious as possible to the passage of steam.

It is also my purpose to provide improved packing means between the piston and the casing so that there will be a minimum of leakage of the working steam from the piston chamber during the operation of the engine.

Other objects will be apparent as the detailed description of one embodiment of the invention hereafter given progresses.

The invention consists in the improved rotary engine to be fully described hereinafter and the novelty of which will be particularly pointed out and distinctly claimed.

I have fully and clearly illustrated my invention in the accompanying drawings to be taken as a part of this specification and wherein—

Figure 1 is a view in side elevation of an engine embodying my invention; Fig. 2 is a view in side elevation of the engine showing the side plates for the rotor casings removed; Fig. 3 is a transverse section through the engine at its center taken on the line 3—3'—3 and to right of center on the line 3—3—3; Fig. 4 is a plan partly in section of a valve used in connection with my improved engine forming part of my invention; Fig. 5 is an enlarged view of the rotors removed from the casing showing the piston construction; Fig. 6 is a detail sectional view through a part of one of the piston blades showing the construction of the side checks, the section being taken transversely through the blade; Fig. 7 is a detail sectional view taken longitudinally of the blade showing the construction of the side checks; Fig. 8 is a detail sectional view of one of the steam checks employed adjacent the point of contact between the rotors; Fig. 9 is a detail perspective view of one of the fixed hubs for the rotor casing; and Fig. 10 is a detail sectional view taken through a part of one of the rotors and the adjacent parts of the fixed hubs; Fig. 11 is a view in side elevation of a part of one of the clearance rings showing another means for adjusting the same in the casing; Fig. 12 is a detail sectional view through a part of the casing and one of the clearance rings showing the rack and pinion for adjusting the same; Fig. 13 shows a detail of means for manually adjusting the valves to regulate the point of cut-off.

Referring to the drawings by characters of reference A designates generally the casing of the engine in which the several correlated parts are assembled and arranged in operative combination. The design of this casing is capable of wide variation but I prefer to construct the same of substantial castings in as few parts as possible so that a rigid structure is provided in which liability of leakage is reduced to a minimum. With these ends in view the casing includes a main body portion or shell 1, formed with two lobes or chambers 2, 2 substantially cylindrical in general contour, and arranged with their central axes on the same horizontal line. This shell at a point above and between the lobes 2, 2 formed with an opening or chamber 3 through which passes a valve shaft to be described hereinafter. The chambers formed by the lobes 2, 2 are closed by end plates or heads 3ª, 3ª, bolted to flanges 4, on the central shell, each of the parts of the end plates which close the cylinders being formed with a central opening 5 which is closed by a capped plug 6, the latter being formed with an annular projection 7 extending into the cylinders through the opening 5, and being of a diameter less than that of said opening so that when the plugs are in position there is an annular space 8 between the outer surface of each of the annular projections 7 and the inner face of the opening 5 for a purpose to be presently described. Each of the cylinder heads is formed at its upper central portion with an integral chamber $3^b$, there being two of said chambers, one being on each side of the central shell, as clearly shown in Fig. 2, said chambers being cylindrical in form and arranged on a common axis which passes through the opening 3, in the central shell. These chambers are preferably formed by annular flanges on the heads, and are closed on one side by heads or plates $3^c$, $3^c$, formed with central openings for the valve shaft in alinement with the opening 3.

Arranged within each of the cylinders 2, 2 is a rotor 9 which is substantially cylindrical in general contour, said rotors being each provided with annular side extensions 10, 10, which surround the annular projections 7, 7 and project within the annular spaces, said extensions being of a thickness less than the width of said spaces so as to turn freely therein when the rotors are turned under influence of a fluid under pressure. Each rotor 9 is mounted upon its individual shaft 11, extending horizontally through the plugs 6, the opening 12 through the plugs being of greater diameter than the diameter of shaft to permit insertion of an annular packing ring 13, surrounding the shaft and compressed against a shoulder 14 in the plug by means of an annular compression ring 15, also surrounding the shaft and threaded into the plug opening as shown at 16. The rotors 9, 9 are each keyed to their respective shafts as shown at 17, and are held in position therein against endwise movement of the shaft by a movable collar 19 threaded on the shaft, the latter collar being operable to clamp the rotor against the fixed collar $19^a$.

Both ends of each shaft are provided with suitable anti-friction bearings which for the purposes of this application are shown as consisting of a bearing ring 20 surrounding and fixed to the shaft and abutting a shoulder 21 on the shaft, said ring having a circumferential ball race 22, in which travels a series of balls 23, the other portion of the bearing consisting of a ring 24 fixed in the plug 6 and having an integral ball race 25. These bearings which are capable of wide variations in construction, are isolated from the steam side of the casing by the packing heretofore described, so that said bearings are not subjected to steam or other leakage from the cylinders and are therefore not likely to become impaired by rust. Between the bearings and the packing I may place a ring 26 to confine what leakage may get by the packing from getting to the bearings, and to cause the same to flow from the space around the shaft through a suitable drain 27 through the plug wall. This ring also prevents escape of the bearing lubricant from the bearings. The bearings at one end of the shafts may be provided with closure rings or annular plates 28 to prevent escape of lubricant from the bearings and access of dirt to said bearings. At the opposite end of each of said shafts from that at which the plates 28 are located is an improved form of thrust bearing which includes means for shifting the shaft longitudinally to properly center the rotor thereon between the side walls of the casing. This bearing includes a sleeve 29 surrounding the shaft outside the roller bearings first described, said sleeve carrying an intermediate, outwardly projecting flange or collar 30, on the opposite sides of which are arranged series of bearing balls 31, said balls being confined by retaining collars $31^a$ loosely mounted on said sleeve. The outer side surfaces of said retaining collars are inclined as at 32 for a purpose to be presently set forth. Surrounding the sleeve and the parts mounted thereon, is a cylindrical bearing box 33 internally curved to receive the parts of the bearing mounted on the shaft and formed at its inner end with an inclined annular face 34 which engages the inclined face 32 on the inner retaining ring. This box 33 is threaded into the opening through the plug 6, so that by rotation of said box it will be moved back and forth in the plug. At its outer end said box is internally threaded as at 35 to receive a cap 36 which is formed with an internal inclined face to coöperate with the inclined face of the outer retaining ring $31^a$, said cap 36 serving to retain the parts within the bearing box and also as means for adjusting the bearings relative to the flange 30. It will be seen that in order to adjust the parts of the bearing relative to said flange that it is only necessary to screw the cap 36 in or out accordingly as it is desired to move the bearings into greater or less engagement with said flange. When it is desired to shift the shaft longitudinally to center the rotor in the casing, the bearing box 33 and the cap 36 are rotated as an entirety, so that the entire bearing may be moved in one direction or the other, and through connection with the shaft by means of the flange 30 and sleeve 29, will shift the shaft the desired distance to properly center the rotor. Both rotor shafts are preferably provided with a bearing of the character just set forth and a description of one is deemed sufficient for both.

As heretofore stated, the rotors consist of cylindrical bodies, each of which is provided with an annular blade or piston against which fluid under pressure is admitted in order to drive the rotors in opposite directions. In the present embodiment said blades or pistons being so arranged that steam under pressure may be admitted between the same and cut off, the steam operating, by its expansive force, to force the blades away from each other and thereby rotate the rotors in opposite directions.

For purposes of this application I have shown the pistons as consisting of rigid blades projecting outwardly from the cylindrical surfaces of the rotors, said blades being shown respectively at 37 and 38. The blades as shown are inclined with reference to the circumference of the rotors, the inclination of the blade 37 being rearward relative to the direction of rotation of its rotor while the blade 38 inclines forwardly in the direction of rotation of its rotor, the purpose of this arrangement being, in part, to so locate the blade that the steam clearance at the point of inlet of the steam to the cylinders will be reduced to a minimum in order that the full expansive force of the steam will be exerted upon the blade without loss through unnecessary clearance.

It will be noted upon reference to Fig. 5 of the drawing that the cylindrical rotors are arranged in rolling contact with each other. In other words, their circumferential faces are adapted to be in contact at a point between their shafts while the machine is in operation. In order to provide for the passage of the blades during the rotation of the rotors, each rotor is provided at the base of its blade with a circumferential recess 39 adapted to receive the blade of the opposite rotor when said blades arrive at the point by which the rotors contact. In the present embodiment the recess of one of the rotors is shown in rear of its blade, while in the other rotor said recess is located in front of its blade.

By reference to Fig. 5 it will be seen that the edge of the recess 39 carries a hollow frangible metal strip 39ª which is preferably hollow and which is adapted to take a form permitting the easy passage of the blade on the opposite rotor into said recess, the formation being determined by the engagement of the blade with said strip, that is to say, should for any reason the edge of the recess not properly engage with said blade by projecting too far outward, said blade will mash down or chop off enough of the frangible strip to provide for proper relation between the parts.

Any suitable means may be employed for rigidly connecting the blades to the respective rotors, but I prefer to employ the improved arrangement shown in Fig. 5 in which the cylindrical face of the rotor is cut to form a stepped recess 40 adapted to receive the base of the blade which is correspondingly stepped as at 41, to fit the stepped portion of the rotor, the blade being held in place by bolts 42 let through the base of the blade in front and rear of the latter and extending into the body of the rotor at angles to each other. The strain to which the blade and the bolts are subjected is relieved by a transverse key 43 engaging the rotor and the base of the blade and serving also to assist in securing the blade in position.

As heretofore stated the rotors are arranged in rolling contact and in order to provide means whereby this contact will be such as to prevent leakage of the steam between the rotors at the point of contact, I prefer to form the surface of at least one of the rotors with a surface which will readily accommodate itself to the surface of the other rotor and which will permit the passage of foreign particles between the rotors without danger of moving the rotors apart, and thus breaking their contact and injuring the bearings. I accomplish this result by forming one of the rotors with a channeled circumference as at 44, in which is cast a soft metal band, such, for instance, as Babbitt metal, the ends of said strip being separated for a distance in order that there may be accommodation for the lengthwise flow of the metal due to the pressure exerted thereon by the contact of the rotors. The preferred manner of securing the metal band in place is shown in Fig. 2, in which the side flanges of the channel are undercut and said channel is formed with a longitudinally extending intermediate dovetail 45 with which undercut portions and dovetail the soft metal interlocks to prevent radial dislodgment of the same. It will be apparent that by the use of this material the soft face of one of the rotors will accommodate itself to conform to the surface of the opposite rotor, to form a steam-tight joint between the same and should any foreign particle pass between the rotors, it will sink into the soft metal instead of operating to pry the rotors apart.

Each of the blades referred to above is provided with suitable side and end checks to prevent side and end leakage of the steam past the same, said blades being preferably longitudinally recessed at both side edges to receive a rigid metal check 46 provided with a pin 47 which projects into a slot formed in the edge of the blade, said blade having recesses 48 in which are located springs 49 operating expansively to press the checks outwardly into close engagement with the internal side walls of the rotor chamber. The end check 50 for each blade is arranged in a groove extending transversely of the end of the blade, the blade and check being formed with interlocking parts which prevent removal of the check by a movement lengthwise of the blade, but permit removal and insertion by a sliding movement transversely of the blade. It will thus be seen that when the end check is slipped into place and the cylinder closed that it cannot be removed or accidentally displaced.

I provide simple and effective means for reducing side leakage and clearance from the steam part of the chamber toward the rotor shafts by providing the side of each of the heads of the chamber with a threaded recess 51 in which is screwed a clearance strip preferably in the form of a ring 52 which extends entirely around the shaft and the inwardly extending extensions 7 on the plugs of the casing. The threads of these clearance rings are arranged in the same direction as the direction of rotation of the rotors, or reversely to each other so that should, for any reason, too close frictional engagement occur between the side faces of the rotors and said clearance rings by virtue of said frictional engagement, the rotors will operate to turn the rings and screw them away from the rotors until the frictional contact is broken. I provide in the heads of the chambers adjacent each of said rings a slot 53 through which a suitable tool may be inserted for the purpose of engaging the clearance ring to revolve it so as to properly adjust the same, the ring preferably being provided with a socket 54 to receive the tool, this arrangement providing for the convenient manual adjustment of the ring after the parts have been assembled. These clearance strips may also be made of a relatively soft metal, or may be made of stiff metal with soft metal faces on the sides toward the rotors.

I will now proceed to describe the valve means for admitting the steam to the rotor chambers and for so controlling the valve as to vary the point of cut-off of steam in accordance with the speed of rotation of the rotors, so that the steam will always be admitted in such a manner as to secure the most effective and economical results therefrom. Referring particularly to Fig. 2, it will be seen that the inlet 55 for the steam is arranged in the head of the rotor cylinders at a point to one side of a line extending centrally between said rings, said opening communicating with a port 56 which opens outwardly through the head of the valve casing. As shown in Fig. 3, it will be seen that the two inlet ports are provided, one on each side of the rotor casings, so that the steam or other motive agent may be admitted to the rotor cylinders on opposite sides of the latter, whereby provision is made for an increased amount of steam being admitted to the rotor casings. Each of these inlets which has its individual inlet port through the head of its valve casing is controlled by a rotary cut-off valve which will now be described. Extending transversely of the machine through the heads of the valve casings the side plates and the upper opening through the central shell is a horizontally extending shaft 57 which is of a diameter less than the diameter of the openings or bearings through which it extends. Upon this shaft on each side of the chamber 3, is a circular valve disk 58 formed with a sector shaped opening, 59, said opening being arranged to coöperate with the steam ports heretofore mentioned to admit steam to the rotor cylinders, the imperforate portion of the disks serving to close the inlets and cut off the steam to permit the charge admitted to expand within the rotor chamber. Surrounding the shaft at the portions beyond and outside of the disks above described are sleeves 60, 60, each carrying a disk valve 61 arranged closely adjacent the aforementioned valve disks and each having an opening 62 which coöperates or registers with the opening in the first-mentioned valve disk. The sleeves just referred to project outward beyond the heads of the valve chambers and each carries a gear 63 which meshes with a gear 64 on the end of one of the rotor shafts the arrangement being such that the sleeves 60, 60 and the valve disks thereon are revolved by the rotary movement of the rotors. It will be understood that there is a gear on each sleeve and a corresponding gear intermeshing therewith on ends of a rotor shaft, so that both sleeves and disks are driven simultaneously in the same direction, whereby a charge may be admitted through both inlet ports to the cylinders at the same time. It will also be apparent that the speed of rotation of the valve will be determined by the speed of the rotors, and that the point of inlet of steam will be directly, and the point of cut-off indirectly determined, the disks on the sleeves being geared to and driven by the rotors. Means is provided for adjusting automatically the valve disks relative to each other so that the area of the opening through said disks will be varied and the point of cut-off regulated so that the speed of the rotor will be regulated to secure the best results. This means consists preferably of a centrifugal governor indicated generally at 65, carried by the sleeve 60 and so connected to the valve shaft that should the engine overspeed beyond a desired or determined limit, the centrifugal action of the governor parts will turn the valve shaft and the inner valve disks 58 thereon so that said disks will be moved relative to the disks on the sleeves to cause the rear edges of the openings 59 to advance beyond the rear edges of the openings 62 and thereby not only reduce the steam opening through the valves but also advance the point of cut-off whereby the speed of rotation of the engine rotors will be controlled. When running at normal speed the disks are so arranged that their openings will approximately register for part of their area, such area being determined by the amount of load on the engine and the governor is of course set to accomplish this result. The construction of the governor is immaterial and I do not therefore specifically describe the same, although I have fully illustrated a preferred type in the drawings.

Any suitable means may be employed for securing the disks 58 to the shaft but I prefer to key the same thereto as shown at 66, and to hold the same against longitudinal movement by a flange 67 on the shaft located within the chamber 3, the valve disk having a sleeved extension 68 projecting within said chamber and abutting the said flange, the disk being moved toward and held against said flange by a nut or collar 69 threaded on the shaft, the threads running in a direction opposite to the rotation of the shaft so as to obviate danger of retracting the nut during the rotation of the valve.

An important advantage of the double valve and inlet arrangement resides in the fact that when the inlets are closed by the imperforate portions of the pairs of disks, the restrained steam which is exerting pressure on one valve is counter-balanced by the steam or the valve controlling the opposite inlet so as to reduce end thrust on the valve shaft under pressure of the confined inlet steam.

I provide simple and effective means for producing what I call "net" valve opening by which term I mean a valve opening which is actually equal to the difference between the desired point of inlet and cut-off so that steam clearance will be reduced to a minimum and the inlet and cut-off will take place at exactly the right instant. I accomplish this by providing the forward edge of one disk and the rear edge of the other disk with a plate 70 constituting a partition which projects into the opening in the opposite adjacent disk and thereby provides a straight determined passageway through the disks. It will thus be apparent that the space formed between the front edges of the openings, and also between the rear edges thereof are cut off from the line cylinder steam whereby losses due to clearance at these points is prevented. These plates may be secured in position in any desired manner but I prefer to use screws or bolts 71 as shown in Fig. 4.

In connection with the valve shaft I employ a novel arrangement of thrust bearing and packing for isolating the bearing from the steam side of the casing and providing for access to the packing without removal of the bearing. Each of the heads or closures for the valve casings is provided with an extension 72 which is cored out to receive the valve shaft and the sleeve 60, said cored out portion being larger than the diameter of the shaft and sleeve, and formed with a shoulder 73 adjacent the valve disks. Surrounding the sleeve and abutting the said shoulder is suitable packing 74 which is compressed against the said shoulder by a retaining ring 75 threaded into the bore of the extension, as at 76, access being had to this retaining ring through an opening 77 in said extension so that the ring may be adjusted. Within the core of said extension outside the opening 77 is a second shoulder 78 which receives a thrust ring 79 having an inwardly inclined side face 80 with which coöperates a bearing annulus 81 having a correspondingly inclined face to engage said inclined face. About the sleeve and engaging the straight face of the bearing annulus is a series of bearing balls 82 retained in place by a second bearing ring 83 which in turn is held in place by a retaining ring 84 which engages the same and abuts a shoulder 85 on the sleeve. Arranged outside this thrust bearing is a radial bearing 86 which may be of any desired type, an end plate or annulus 87 being threaded or otherwise secured to close access to the bearings. From the above it will be seen that the packing is located between the steam side of the chamber and the bearing so that the latter is isolated from the interior of the chamber. Bearings and packing of the character just set forth are arranged at both ends of the valve shaft, but it is thought a description of one will suffice for both.

I provide means for balancing the fluid pressure load on the rotors which is transmitted to their bearings by employing the expansive force of a fluid under pressure between a fixed part of the casing which serves to not only relieve the bearings of the load but to tend to move the rotors toward each other to insure approximate rolling contact between the same. I accomplish this by forming the outer face of each of the extensions 7 on the casing plugs 6 with a plurality of chambers 88, said chambers being preferably formed by partitions 89 of Babbitt metal cast in said faces, and admit steam from the working cylinder to said chambers, said steam acting by its expansive force against the extensions 7 and the parts 10 of the rotors to oppose the radial load exerted by the power steam upon the rotors. This is accomplished by providing ducts or passages 90 leading from the steam side of the piston blades through the rotor to said chambers, so that any pressure causing a radial load on the circumference of the rotor is opposed by a corresponding and substantially equal pressure on the extensions of the rotor which move over said chambers. I preferably so arrange the Babbitt metal partitions 89 that the chambers run diagonally of the extensions of the heads of the cylinders, and provide the rotors with a series of passageways communicating with them, whereby as the rotors are turned by the steam and the area subjected to load increases the steam will be passing from a number of said passageways into the said chambers. I arrange the chambers diagonally so that as the rotors turn the counterbalancing pressure will keep abreast of the exterior portion of the rotor behind the piston which is subjected to the load.

In order that the weight of the rotors will be properly balanced I core out each rotor at a point diametrically opposite the recess 39, as shown at 91, and the duct or ducts for the balancing steam through these chambers is confined by a tube 92 connecting the parts of the duct which open unto said chamber. This tube prevents steam from entering the chamber and filling the same and tending to produce undesirable load conditions, and an unnecessary loss of steam. The outer edge of the blade 38 may also be provided with a conformation strip 38ª of material which upon rotation of the rotors will conform to the recess of the opposite rotor to insure easy and smooth passage of the parts when the blades of the rotors pass each other.

It will be noted, upon examination of Figs. 2 and 5, that the side faces of the rotors are continuous at the points where the recesses for the passage of the blades are located, which is desirable in that it provides a continuous cylindrical rotor, and also obviates distortion which is liable to occur, were the side faces cut out. This construction also reduces leakage and condensation.

In Figs. 11 and 12 I have shown another means for manually adjusting the clearance rings. This means consists of an internal segmental rack 93 on the side of the rings toward the casing, there being a segmental recess 94 in the said ring in which recess the rack is seated. Coöperating with this rack is a pinion 95 mounted on a shaft 96 having bearing in the casing as at 97, the bearing being packed by packing 98, and a packing nut 99 on said stem and threaded into the casing. By "progressive balancing" I mean a balancing which progresses, or in which the area increases as the area of the rotor subjected to the radial load increases or progresses, upon each cycle of the rotor.

In this specification and the claims wherever I employ the term "two rotors" I intend the term to apply not only to the type of engine I have described in which there are two working pistons, but to a type in which there is one rotor constituting a piston and another rotor acting as an abutment coöperating with the piston. I also desire it understood that many of the details set forth, and, in fact, the entire construction, is available for use as a pump and the claims are intended to cover a structure embodying the invention whether it be applied to a pump or to an engine.

In Fig. 13 I have shown manual means for operating the valve disks to vary the cut-off. In this construction the sleeve carrying the disk 61 is formed with a spiral or spherical groove 100 to receive projections 101 on a sleeve 102, the latter having an internal projection 103 fitting within a groove 104 extending longitudinally of the shaft 57. The end of the sleeve 102 opposite to that carrying the projections 101 is formed with a lateral spherical flange 105, which is arranged within a box 106 which is adapted to rotate relative to said flange, but which is operative when moved lengthwise of the shaft 57 to impart a corresponding longitudinal movement to said sleeve 102. I may arrange ball bearings 107 between the faces of the flange 105 and the adjacent faces of the box 106. Connected to the box 106 in any suitable manner is an adjusting rod 108 threaded in a pillow-block 109 and carrying at its outer end a hand wheel or other means by which it may be moved manually. Whenever it is desired to adjust the valve disk 61 relative to the disk 58 the hand wheel 110 is rotated in the proper direction and serves to either push or pull the sleeve 102 lengthwise the shaft, according to the direction in which said hand wheel is rotated. This movement of the sleeve longitudinally of the shaft through its connection with the groove 101 serves to rotate the disk in a manner which it is thought will be obvious without further description.

Having thus described my invention, what I claim as new and desire to secure by Letters Patent is:

1. In a rotary engine, a casing, rotors in the casing in approximate rolling contact with each other, means for exerting pressure on said rotors to rotate them and resulting in a radial load on said rotors, and means for progressively balancing said radial load thus tending to preserve the approximate rolling contact of the rotors.

2. In a rotary engine, a casing, rotors in the casing in approximate rolling contact with each other, means for exerting fluid pressure on said rotors to rotate them and resulting in a separate radial load on each rotor, and means for progressively counterbalancing said load to maintain the approximate rolling contact of the rotors.

3. In a rotary engine, a casing, rotors in the casing in approximate rolling contact with each other and running in opposite directions, means for exerting pressure on said rotors to rotate them, resulting in a radial load on an area of each rotor, and means for progressively counterbalancing said load to maintain the approximate rolling contact of said rotors.

4. In a rotary engine, a casing, rotors in the casing in approximate rolling contact with each other, means for exerting a fluid pressure agent upon both said rotors to rotate them in opposite directions and whereby each rotor is subjected to a radial load, and means operated by the same fluid pressure agent exerting the load for progressively opposing said load to insure close rolling contact of said rotors.

5. In a rotary engine, a casing, rotors in the casing in approximate rolling contact with each other, means for exerting fluid pressure on both said rotors to rotate them, whereby said rotors are each subjected to a radial load, and fluid pressure means acting to progressively oppose the radial load on each rotor and tend to preserve their approximate rolling contact.

6. In a rotary engine, a casing, rotors in the casing in approximate rolling contact with each other, a piston on each of the rotors, means for introducing a fluid pressure charge between the pistons to rotate them in opposite directions and resulting in a varying radial load on each of said rotors, and means operated by a portion of said charge to progressively counterbalance said loads and assure the approximate rolling contact of the rotors.

7. In a rotary engine, a casing, rotors in the casing in approximate rolling contact with each other, bearings for the rotors, means for exerting pressure on said rotors to rotate them in opposite directions and resulting in a load toward the bearings, and fluid pressure means acting progressively between the bearing and the area subjected to load tending to insure approximate rolling contact of said rotors.

8. In a rotary engine, a casing, rotors in the casing in approximate rolling contact with each other, bearings for the rotors, means for exerting pressure on said rotors to rotate them in opposite directions and resulting in a load toward the bearings, and fluid pressure means acting between the bearing and the area subjected to load tending to insure approximate rolling contact of said rotors, said counterbalancing fluid pressure being on the same side of the axis of said rotors as the areas of the rotors subjected to said loads.

9. In a rotary engine, a casing, rotors in the casing adapted to roll in contact with each other, shafts upon which the rotors are mounted, gearing connecting the rotor shafts, means for subjecting the rotors to fluid pressure tending to rotate the same in opposite directions and resulting in a radial load on said rotors toward their shafts, and fluid pressure means for progressively opposing said load and tending to move the rotors toward each other to cause rolling contact of their faces.

10. In a rotary engine, a casing, a plurality of cylinders each containing a rotor, said rotors adapted to roll in contact with each other, fluid pressure means for rotating said rotors in opposite directions, a fixed part in each cylinder, means for introducing fluid pressure between each rotor and the fixed part on its cylinder tending to move the rotors toward each other to place them in rolling contact.

11. In a rotary engine, a casing, a rotor therein having a stepped seat and a recess in said seat, a stepped blade fitting said stepped seat and having a recess alining with the first named recess, a bolt for securing the blade in place and a key seated in said alining recesses.

12. In a rotary engine, a casing, a rotor therein having a stepped seat and a transverse recess in said seat, a stepped blade filling said stepped seat and having a transverse recess alining with the first named recess, a bolt for securing the blade in place, and a transverse key seated in said alining recesses.

13. In a rotary engine, a casing, rotors arranged within the casing adapted to roll in contact with each other one of said rotors having a circumferential channel and a soft metal contact face mounted in said channel.

14. In a rotary engine, a casing, a rotor in the casing, annular clearance strips in the casing to reduce the axial clearance between the rotor and casing, and normally out of contact with the rotor, and manually-operated means for adjusting the said strips relative to the rotor during the rotation of the rotor.

15. In a rotary engine, a casing, a rotor in the casing, annular clearance strips in the casing to reduce the axial clearance between the rotor and casing, and normally out of contact with the rotor, and means whereby the said strips are automatically cleared if engaged by the rotor.

16. In a rotary engine, a casing, a rotor in the casing, annular clearance strips in the casing to reduce the clearance between the rotor and casing, and normally out of contact with the rotor, means whereby said strips are held in rigid position, and means whereby said strips are automatically cleared if engaged by the rotor.

17. In a rotary engine, a casing, a rotor turning in the casing, clearance rings in the casing to prevent side leakage past the rotor, said rings being so arranged that if frictionally engaged by the rotor they will automatically clear themselves.

18. In a rotary engine, a casing, a shaft extending through the casing, a rotor on the shaft within the casing, clearance strips in the ends of the casing surrounding the shaft, and approaching the ends of the rotor, and means independent of the rotor for positively limiting the movement of said strips axially of the shaft toward the rotor.

19. In a rotary engine, a casing, a rotor in the casing, side clearance rings threaded into the sides of the casing and arranged so that if engaged frictionally by the rotors they will be screwed away from the rotor into the casing wall.

20. In a rotary engine, a casing, rotors in the casing adapted to rotate in contact with each other, said casing having a recess adjacent the point of contact of the rotors and a steam check to prevent side leakage between the rotors and casing adjacent said point of contact.

21. In a rotary engine, a casing, rotors in the casing adapted to roll in contact, the side edges of said rotor being shouldered inwardly and a check on the casing projecting within the space formed by the shouldered edges of the rotors adjacent the point of contact, whereby leakage between the rotors and casing adjacent the point of contact is prevented.

22. In a rotary engine, a casing, a rotor within the casing, the blade on the rotor, means for exerting fluid pressure on the blade to turn the rotor and side and an end check on the blade to reduce leakage past the blade, said end check being slidable across the face of the blade and having interlocking engagement therewith, and means between the side strips and the rotor to prevent longitudinal movement of the side strips.

23. In a rotary engine, a casing, a rotor in the casing, a stepped recess in the rotor, a blade having a stepped part seated in said recess and fastening bolts for securing the stepped parts together, said bolts passing through the stepped portion of the blade at angles to each other.

24. A rotary engine having a rotor inclosed in a casing, an annular clearance strip mounted in the side of the casing adjacent to the rotor and concentric thereto and extending along in the direction of rotation, said strip being located radially within the periphery of the rotor and means for adjusting said strip toward the rotor.

25. In combination, a rotary engine having a rotor inclosed in a casing, annular strips mounted in the sides of the casing on the opposite sides of the rotor and concentric thereto and adjacent to the side faces thereof, said strips being threaded into the casing and radially located wholly within the periphery of the rotor.

26. In combination, a rotary engine having a rotor inclosed in a casing, annular strips in the sides of the casing on the opposite sides of the rotor and adjacent to the side faces thereof, said strips being threaded into the casing, the thread of one strip being the reverse of that of the other strip.

27. In a rotary engine, a casing, a rotor turning in the casing, inlets on opposite sides of the rotor and rotary valves rotatable on an axis independent of the rotor for simultaneously admitting fluid pressure into the cylinder through said inlets.

28. In a rotary engine, a casing, rotors in the casing, pistons on the rotors, inlets on opposite sides of the casing for admitting fluid pressure between said pistons to cause the rotors to turn in opposite directions and cut off valves independently controlling said inlets to simultaneously admit fluid pressure from both inlets between the blades.

29. In a rotary engine, a casing, a rotor in the casing an inlet to the casing, a valve controlling the inlet, said valve comprising relatively movable elements having registering openings adapted to rotate continuously means for automatically adjusting said elements relative to each other to change the positions of said openings whereby the point of cut-off of the valve is regulated, and a projection on each disk projecting into the opening in the opposite disk.

30. In a rotary engine, a casing having an inlet, a rotor turning in the casing, a valve shaft, a valve disk turning with the shaft and having an opening to coöperate with the inlet, a second valve disk adapted to rotate with the first-mentioned disk and movable relative thereto and having an opening registering with the opening in the said first mentioned disk, a plate on each disk projecting into the opening of the opposite disk, said plates isolating the steam opening through the disks and means for automatically changing the position of said disks to vary the point of cut-off through the registering openings therein.

31. In combination with an engine, a valve consisting of two adjacent disks rotating in the same direction and at the same rate of speed but capable of varying their angular relation, each of said disks having an open sector, part of said open sector in one disk being constantly opposite part of the open sector in the other disk, the varying angular relation of said sectors being controlled from without the engine, the open sector common to both disks at any time being isolated from the individual sectors not in common at that time, by a block or flange extending from each disk, at one end of its sector, into the other disk inside of its open sector, substantially equal in size and form to a section of said open sector taken normal to its direction of rotation.

32. In combination with an engine, a valve consisting of two adjacent disks rotating in the same direction and at the same rate of speed but capable of varying their angular relation, each of said disks having an open sector, part of said open sector in one disk being constantly opposite the open sector in the other disk, means from without the engine for varying the angular relation of said sectors, the open sector common to both disks at any time being isolated from the individual sectors not in common at that time by a block or flange extending through each disk, at one end of its sector, into the other disk inside of its open sector substantially equal in size and form to a section of said open sector taken normally to its direction of rotation.

33. In combination with an engine, a valve consisting of two adjacent disks rotating in the same direction and at the same rate of speed but capable of varying their angular relation, each of said disks having an open sector, part of said open sector in one disk being constantly opposite part of the open sector in the other disk, the varying angular relation of said sectors being controlled from without the engine, the open sector common to both disks at any time being isolated from the individual sectors not in common at that time, by a block or flange extending from each disk, at one end of its sector, into the other disk inside of its open sector, substantially equal in size and form to a section of said open sector taken normal to its direction of rotation, and means for automatically controlling the angular relation of the sectors.

34. In a rotary engine, a casing, a rotor, an annular extension on said casing extending into an annular recess on a side of the rotor, balancing chambers formed in the surface of said annular extension, said chambers being formed by metal partitions seated in slots in said extension.

35. In a rotary engine, a casing, rotors in the casing, a piston on one of the rotors, a recess in the other rotor to receive the piston at one point in the rotation of the rotors, and a conformation device at one edge of said recess consisting of fragile metal.

36. In a rotary engine, a casing, rotors in the casing, pistons on the rotors, and a recess in each rotor to receive the piston on the opposite rotor, the rotors having continuous side walls inclosing the recesses.

37. In a rotary engine, a casing, a rotor in the casing, steam inlets at opposite points in the casing, a shaft, a rotatable valve for each of said inlets and rigidly mounted on the shaft, and ports leading to said inlets controlled by the valves, arranged to subject the valves to the pressure of the steam in opposition to balance the end thrust on the valve shaft.

38. In a rotary engine, a casing, a rotor in the casing, inlets at opposite sides of the casing chamber, a rotatable valve controlling each of the said inlets, said valves being connected to each other in rigid relation, and steam ports leading to said inlets, said ports delivering the steam to one valve in one direction and the other inlet delivering steam to the other valve in an opposite direction whereby end thrust on the valves is balanced.

39. In a rotary engine, a casing, a rotor in the casing, an inlet to the casing, a valve controlling the inlet, said valve comprising relatively movable elements having registering openings adapted to rotate continuously, and means for adjusting said elements relative to each other to change the positions of said openings whereby the point of cut-off of the valve is regulated.

In testimony whereof I have signed my name to this specification in the presence of two subscribing witnesses.

GERARDUS POST HERRICK.

Witnesses:
M. E. McNINCH,
C. G. HEYLMURE.